United States Patent [19]
Hsu et al.

[11] Patent Number: 5,311,410
[45] Date of Patent: May 10, 1994

[54] DISTRIBUTED LIGHTING SYSTEM WITH FIBER OPTIC CONTROLS

[75] Inventors: Tsung-Yuan Hsu; Huan-Wun Yen, both of Westlake Village, Calif.

[73] Assignee: Hughes Aircraft Company, Los Angeles, Calif.

[21] Appl. No.: 968,637

[22] Filed: Oct. 29, 1992

[51] Int. Cl.$^5$ .............................................. F21V 19/04
[52] U.S. Cl. ........................................ 362/20; 385/16; 385/23; 385/19; 362/32
[58] Field of Search ..................... 362/32, 20; 385/16, 385/19–23

[56] References Cited

U.S. PATENT DOCUMENTS

| | | | |
|---|---|---|---|
| 4,082,435 | 4/1978 | Zeitz | 385/16 |
| 4,774,407 | 9/1988 | Erbe | 385/16 |
| 4,811,172 | 3/1989 | Davenport et al. | 362/61 |
| 4,836,636 | 6/1989 | Obara et al. | 385/23 |
| 4,868,718 | 9/1989 | Davenport et al. | 362/32 |
| 4,930,049 | 5/1990 | Davenport et al. | 362/32 |
| 4,949,227 | 8/1990 | Finch et al. | 362/61 |
| 4,958,263 | 9/1990 | Davenport et al. | 362/32 |
| 5,184,883 | 2/1993 | Finch et al. | 362/32 |

FOREIGN PATENT DOCUMENTS 0198718  8/1989  Japan ..................... 385/19

*Primary Examiner*—Carroll B. Dority
*Attorney, Agent, or Firm*—V. D. Duraiswamy; W. K. Denson-Low

[57] ABSTRACT

A vehicle lighting system includes one or more central light sources, a plurality of optical loads including headlight lenses, an optical fiber network that extends from the light sources to illuminate the headlight lenses and other optical loads, and optical switches and oscillators that include respective input fibers illuminated from the light source and output fibers to respective optical loads, and operate by enabling and disabling optical connections between their input and output fibers. The headlight assemblies switch between high and low beams by moving their fibers vertically, and control beam diffusion by moving the fibers parallel to the lens axes, including an automatic diffusion adjustment for a headlight reflection from a vehicle in front. The switches include various mechanisms for moving the input and output fibers into and out of alignment with each other, including a shaped resilient sleeve, a hinge pivotally joining the fibers, an opaque shutter with a transmissive section movable between the fibers, and also a liquid-based switch that relies upon total internal reflection. A feedback mechanism for some of the switches dims the source lamp when the switch is OFF to conserve energy. The oscillators operate by normally urging an input fiber towards an OFF position, at which it actuates a mechanism that shifts it to an ON position at which the mechanism is deactivated. A failsafe system employs multiple light sources, with each source sharing its light output with the load for another source that has failed.

37 Claims, 7 Drawing Sheets

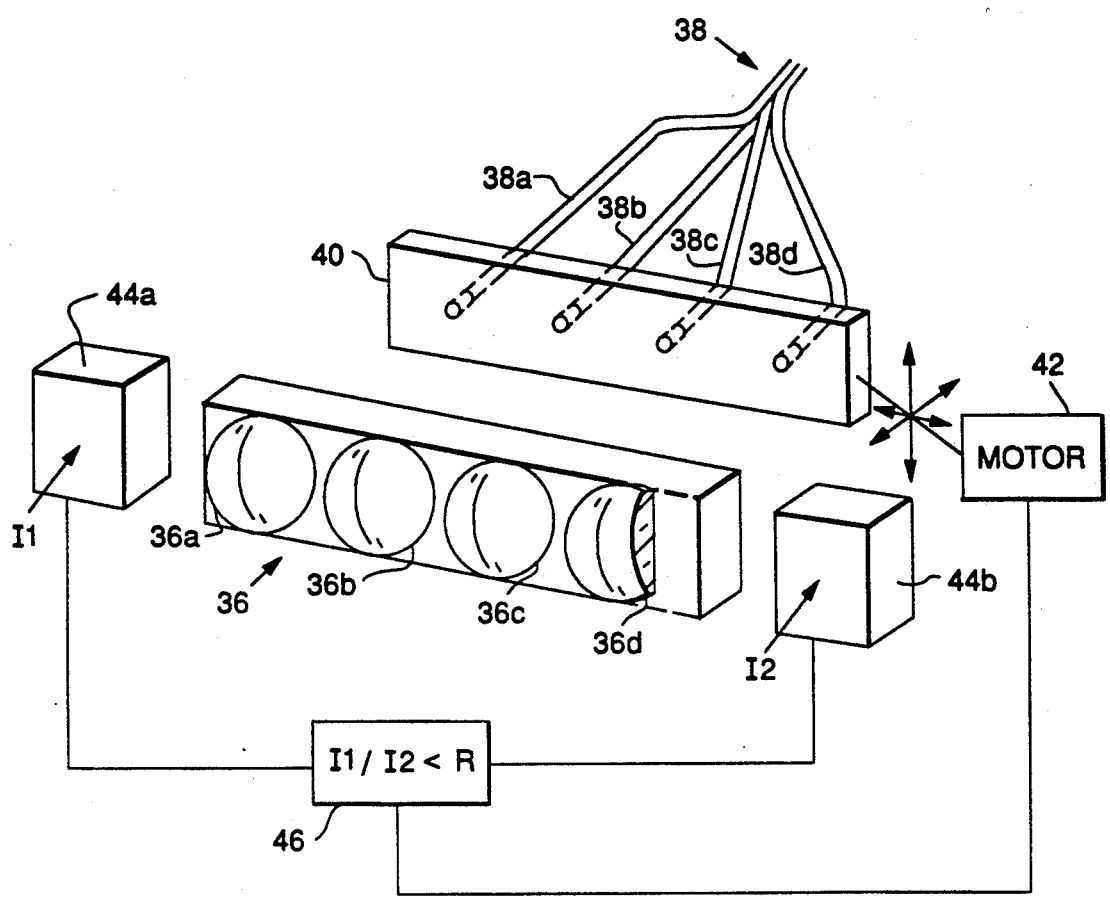
FIG. 2.
FIG. 3.
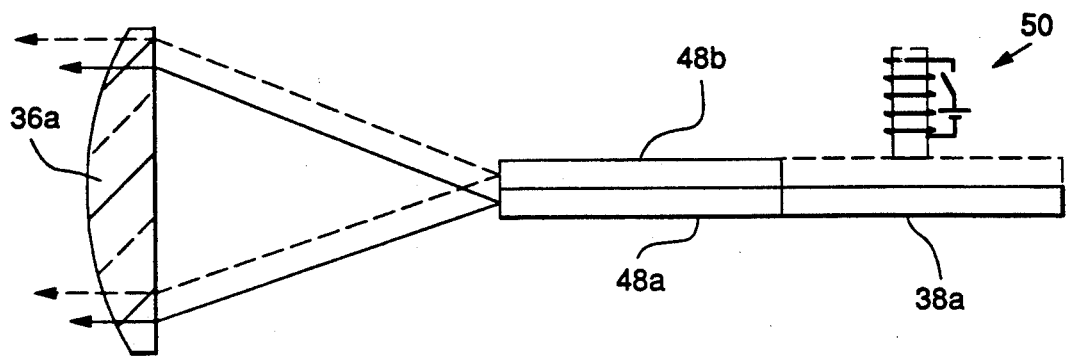

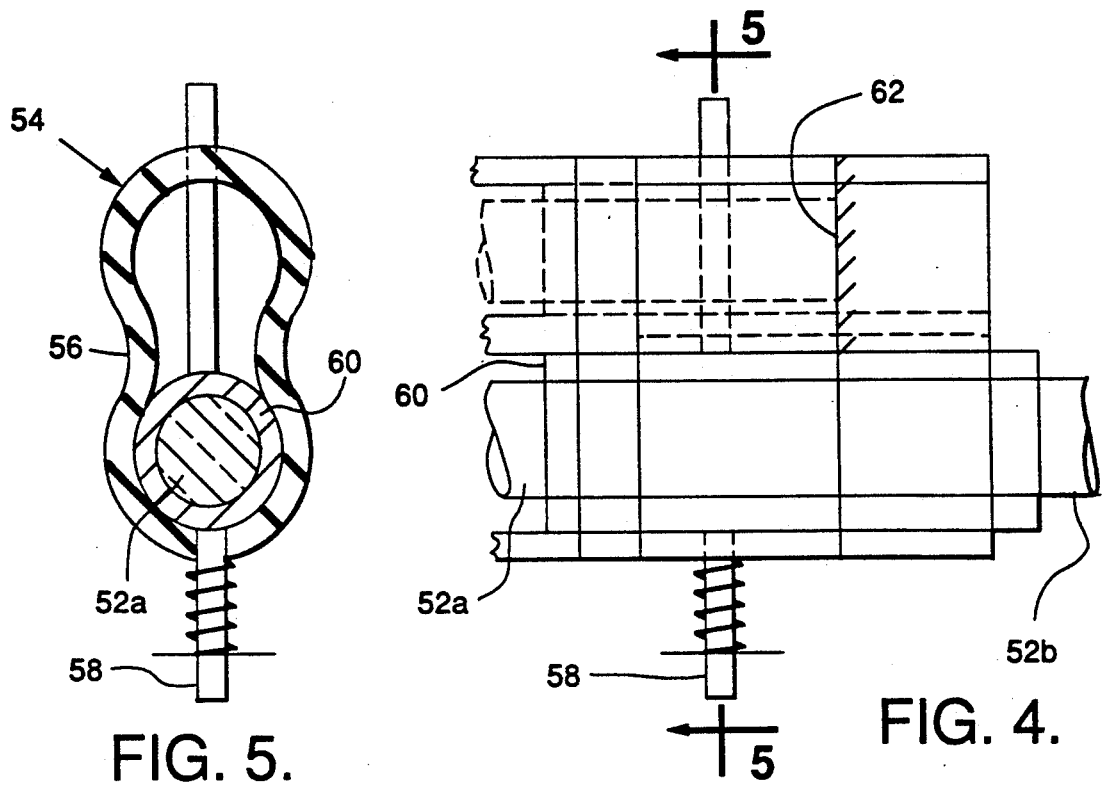
FIG. 5.
FIG. 4.
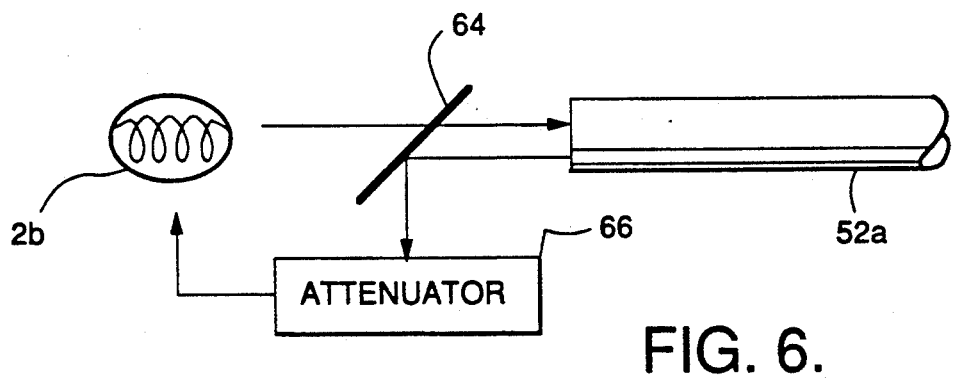
FIG. 6.
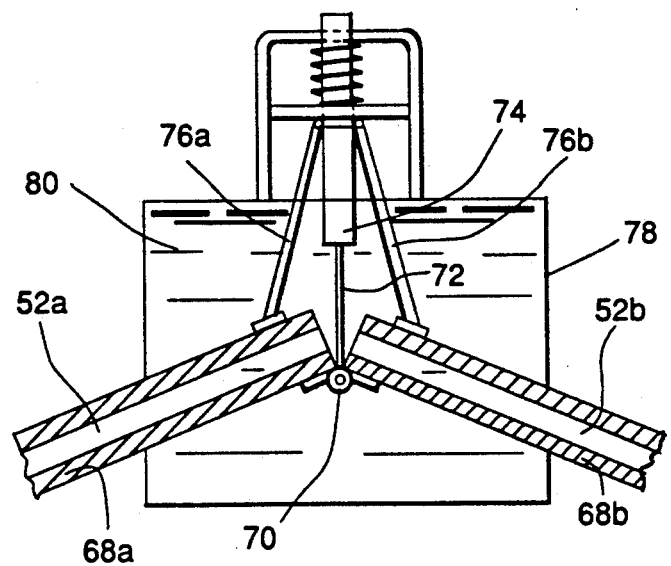
FIG. 7.

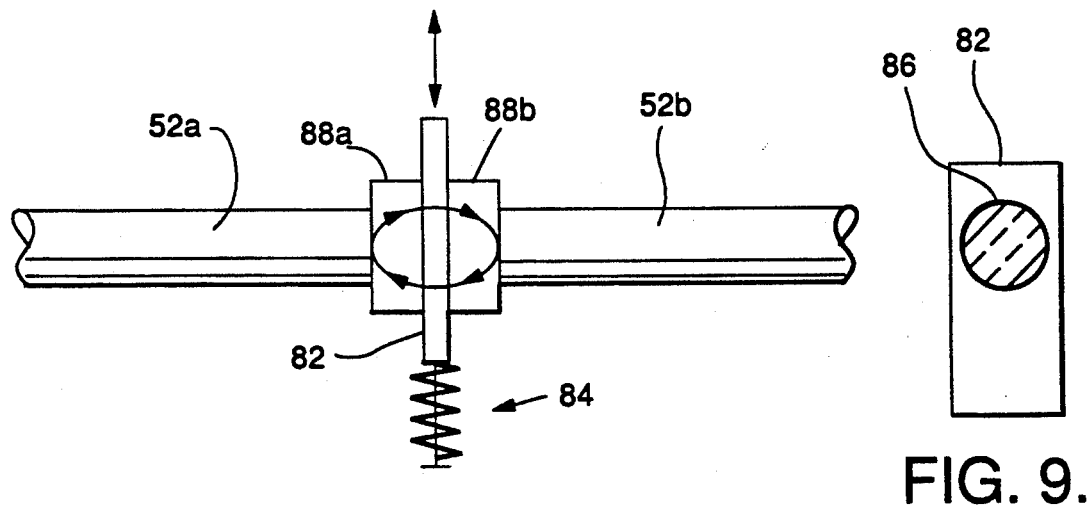
FIG. 8.
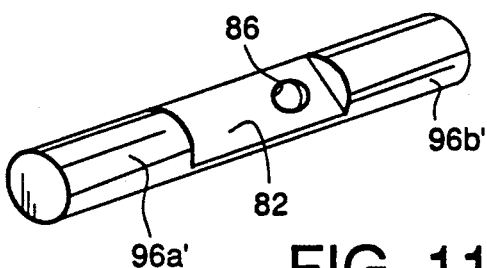
FIG. 9.
FIG. 11.
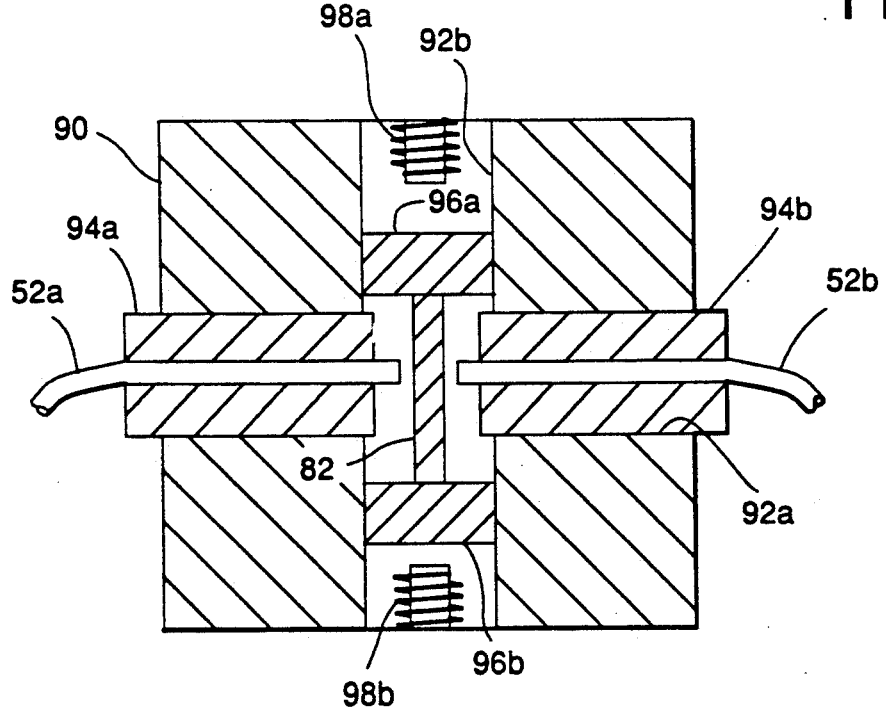
FIG. 10a.

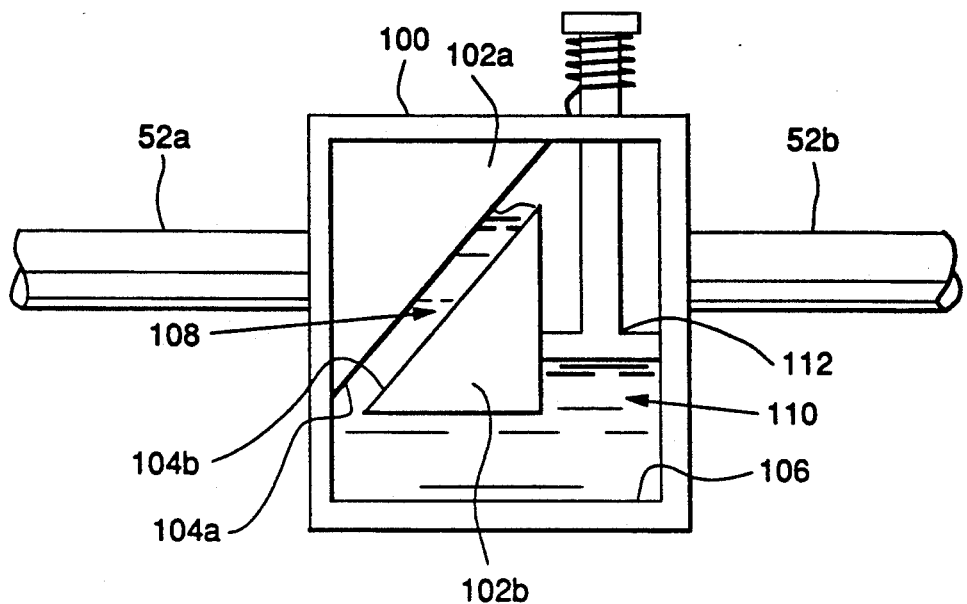
FIG. 12.
FIG. 13.
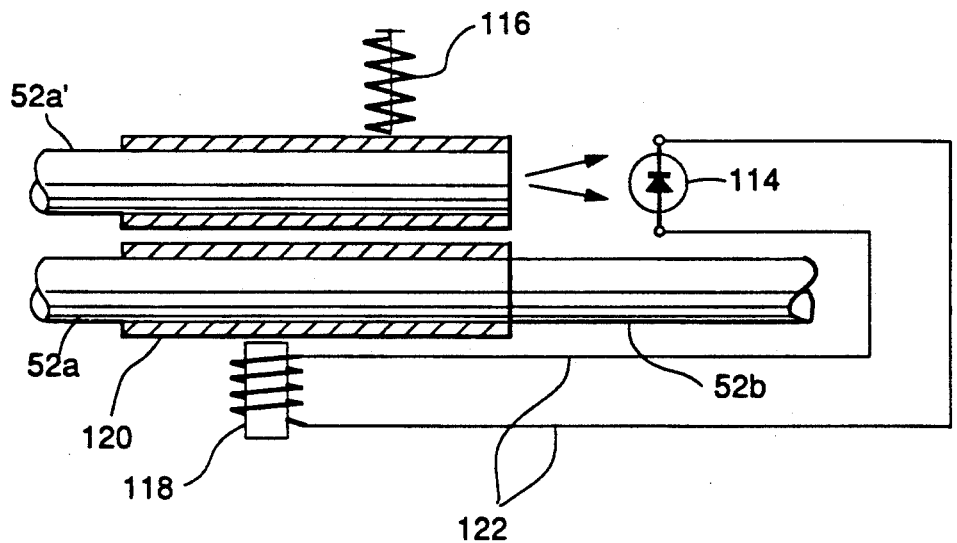

DISTRIBUTED LIGHTING SYSTEM WITH FIBER OPTIC CONTROLS

BACKGROUND OF THE INVENTION

1. Field of the Invention

This invention relates to distributed lighting systems, particularly for room lighting and vehicles, in which optical fibers distribute light from a central source to a number of different optical loads, with the fibers performing various control functions such as switching, oscillation and headlight beam control.

2. Description of the Related Art

Conventional automobile lighting systems use separate light bulbs for each lighting function, resulting in some cases in more than one hundred different light bulbs. This is not a desirable situation for energy efficiency and reliability. Furthermore, some of the bulbs are typically placed in inconvenient locations, making them difficult to access and increasing maintenance costs, especially for instrument panel lightings. The bulbs are powered by an electrical wiring network, leading to the possibility of electrical short circuits that are often difficult to locate. The light bulb systems are also subject to breakage in case of impacts, and add to the weight, bulk and expense of the overall vehicle.

An alternate system in which light is distributed from a central light source to various optical loads within a vehicle by means of "light busses" is described in U.S. Pat. No. 4,930,049 to Davenport et al. The light bus network includes a number of optical control functions, such as a switch, turn signal oscillator and dimmer. All of these devices, however, are subject to improvement. In the optical switch, for example (FIG. 9(b) of the '049 patent), a receiving optical fiber is moved into and out of alignment with a light bus by means of a piezoelectric, electromagnetic, pneumatic bimetal or memory metal mechanism. All of these involve a simple bending of the receiving fiber away from the light bus to turn the switch OFF. This does not account for the fact that light typically spreads out when emitted from the end of an optical fiber, and no mechanism is provided for positively blocking the transmission of light from the light bus to the receiving fiber in the OFF position. Furthermore, the system operates "open loop" in the sense that there is no mechanism to confirm that the fiber has been properly positioned.

In the turn signal oscillator of the '049 patent (FIG. 10(b)), the light bus is moved by an externally controlled mechanical rotating arm into and out of alignment with a receiving "optical carrying member". However, no mechanism is provided to assure that the light bus moves all the way into and then out of alignment with the receiving optical carrying member.

In FIG. 11(b) of the patent, an optical dimming mechanism is disclosed in which a "means" 78 in the optical path alters its transparency between substantially clear and substantially cloudy. However, the manner in which this function is accomplished is not described.

A distributed lighting system in which light from a central light source is carried by a series of optical fibers to an array of headlight lenses is described in U.S. Pat. No. 4,868,718 to Davenport et al. In this patent the ends of the fibers are held stationary in alignment with their respective lenses, while optical wedges or rotating flat members are inserted between the fibers and their respective lenses to shift between high and low beams. In a related system described in U.S. Pat. No. 4,949,227 to Finch et al., a movable mask is placed between the fibers and the headlight lenses to form either a high or a low beam pattern, depending upon the position of the mask. Both of these approaches require the insertion of additional mechanical devices between the fibers and the headlight lenses, thus adding to the cost and complexity of the system.

Another headlight system is described in U.S. Pat. No. 4,811,172 to Davenport et al. in which each headlight has a dedicated light source, with separate optical fibers transmitting light from the source to the various lenses of the headlight. A pair of fibers are provided for each lens and are arranged at an angle to each other, with one fiber on the lens axis and the other off-axis. One of the fibers is illuminated to produce a high beam output, and the other to produce a low beam output. This system requires a redundancy in the optical fibers for each headlight lens, and also requires a separate lamp for each headlight.

A light source for a distributed vehicle lighting system is described in U.S. Pat. No. 4,958,263 to Davenport et al. The source consists of a pressurized lamp with quartz light guides merged into portions of its outer surface to provide illumination for the various optical loads within the vehicle. The portions of the lamp that are not merged with the light guides are coated with a diffusive reflective coating that is said to substantially prevent light from being transmitted through the coating, thereby directing all of the light generated by the lamp into the light guides. However, the patent does not describe any control mechanisms such as optical switches or oscillators. A headlight system is shown, but no mechanism for alternating between high and low beams is presented.

While the centralized lighting systems described in the above patents offer advantages over conventional discrete lighting systems, there is also a significant potential reliability problem. If the central light source fails, all or a large section of the lighting system will be lost. The problem is more severe than in discrete lighting systems, in which the loss of a light bulb affects only its single associated component. The described systems do not provide a failsafe mechanism to prevent a severe disruption of the lighting system when the light source fails.

SUMMARY OF THE INVENTION

The present invention provides a central lighting source with a fiber optic distribution network that is suitable for automobiles, room lighting systems and other applications in which distributed optical loads are supplied by a central light source. Light is provided from a central light source to a number of different optical loads through the fiber network. It offers a more convenient access to the light sources, reduced maintenance costs, higher energy efficiency and reliability, a reduction in the likelihood of short circuits in electrical lead wires, light weight, compactness and high impact resistance, as compared to discrete lighting systems. It also provides improved control mechanisms such as optical switches, modulators and headlight controls, and a failsafe system for the central lighting source, that go beyond the distributed lighting systems in the patents mentioned above.

The distributed lighting system includes a central light source, a number of different optical loads including a plurality of headlight lenses, and an optical fiber network that extends from the central light source to provide illumination for the headlight lenses and the other loads. One or more optical switches are included in the network, with each switch having an input fiber from the light source and an output fiber to an optical load. The switches operate by selectively enabling or disabling an optical connection between their respective input and output fibers. One or more optical oscillators are also included, each having an input fiber from the light source and an output fiber to an optical load. The oscillators operate by oscillating between states that alternately enable and disable optical connections between their input and output fibers.

In the headlight assemblies, each headlight lens is illuminated by a respective optical fiber. The positions of the fibers are adjusted relative to the lenses to control the nature of the headlight beam. The fibers can be moved up or down to switch between high and low beams, and toward or away from the lenses to adjust the beam collimation. The fibers are preferably held in a common mounting member, and a motor can be provided to adjust the position of that member. In a "smart" version, reflections of the headlights back from a car in front are sensed by an optical detector that responds to a wavelength of the headlight beam which is significantly different from the tungsten lamps, and the sensed reflections used to move the fibers closer to the lenses to diffuse the headlight beam. A pair of spaced optical detectors can be used to discriminate between light reflected back from the front and light from an oncoming vehicle in an adjacent lane, and to diffuse the headlight only for the first case.

Various embodiments of an improved optical switch provide for more reliable switching operation. In each embodiment an input fiber provides light from a central source, while an output fiber delivers the light to an optical load. In a first embodiment, a first one of the fibers is housed in a shaped sleeve that includes two stable positions for the fiber. A resiliently deformable section that couples the two stable positions allows movement of the first fiber therebetween, and releasably retains the first fiber in its current stable position. The first fiber is aligned with the second fiber at one but not the other of its stable positions, and a mechanism is provided to move the first fiber through the deformable sleeve section between the sleeve's bistable positions. The sleeve, including the coupling section, is preferably formed from a unitary elastic material, with a rigid inner sleeve around the first fiber within the shaped sleeve.

In another switch embodiment the input and output fibers are secured by a hinge for rotation between an ON position at which the fibers are aligned and adjacent to each other, thereby coupling light from the input into the output fiber, and an OFF position at which the ends of the fibers are separated. An opaque shutter is inserted between the fiber ends in the OFF position, and withdrawn in the ON position. The shutter is preferably mounted on a spring biased plunger that is pivotally coupled to the input and output fibers by means of push rods, with the push rods rotating the fiber ends apart when the plunger is depressed to insert the shutter between them. To prevent reflection losses that might otherwise result from gaps between the fiber ends when the switch is ON, a liquid with a refractive index that is substantially matched to that of the fibers may be sealed between the fiber ends.

Another switch embodiment employs an opaque shutter with a generally transmissive section between the ends of the input and output fibers. The shutter is moved so that it either blocks or permits the transmission of light between the two fibers. Respective gradient index rod lenses are positioned between the shutter and each of the fibers to expand a light beam from the input fiber, and then contract the beam back into the output fiber, after its transmission through the transmissive shutter section. The lenses reduce light losses that would otherwise occur from the fanning of a light beam emitted from the input fiber. The transmissive section can be implemented as a color filter, and the shutter can be moved to intermediate positions between the switch OFF and ON positions to provide a dimming capability. The switch is preferably implemented in a housing that has intersecting fiber and shutter bores. The shutter is held between a pair of pistons in the shutter bore, and the fibers are held by a pair of pistons in the fiber bore. The position of the shutter pistons and their attached shutter can be controlled either by a mechanical mechanism, or by electromagnets within the shutter bore that act upon the magnetic shutter pistons.

To conserve energy when the above switches are OFF and their optical loads are not being served, a feedback mechanism can be provided to reduce the intensity of the light source. This preferably consists of a reflector that is illuminated by the input fiber in its OFF position, and reflects the emitted light back through the input fiber to the vicinity of the light source. There it is extracted and used to lower the energization of the light source.

Another switch embodiment employs a generally optically transmissive housing that has a predetermined refractive index and an internal cavity. Light is transmitted through the cavity between input and output optical fibers. Liquid from a reservoir can be moved into and out of the light path through the cavity. The cavity has a wall that faces the input fiber at a predetermined angle; that angle and the liquid's refractive index are selected so that light is transmitted through the cavity between the input and output fibers when the liquid is in the cavity light path, but is reflected by total internal reflection at the cavity wall and prevented from reaching the output fiber when the liquid is removed from the cavity.

A novel optical oscillator is also described to provide intermittent illumination for a turn signal or the like. An input fiber from the central light source illuminates an output fiber to the optical load in an ON position, and illuminates an optical detector in an OFF position. The input fiber is urged towards its OFF position, preferably by a spring or a bimetallic strip. Illumination of the photodetector actuates a mechanism, such as an electromagnet or heating of a bimetallic strip, to move the input fiber to its ON position; the photodetector is preferably a solar cell that directly provides the electrical energy for this function. In the ON position the light is directed away from the photodetector, which deactivates it and allows the input fiber to return to the OFF position. The input fiber thus oscillates between its ON and OFF positions.

A failsafe system is also provided for the central light source in the form of two light sources that are connected by respective sets of optical fibers to respective sets of optical loads. Beam splitters that are normally held out of the operative light paths are actuated to divert a portion of the light from one source to the loads for the other source when the other source fails. In the preferred embodiment a separate beam splitter is provided for each light source. The beam splitters each have a first non-actuated position, a second position at which they divert a portion of the light from their respective sources to the optical loads for the other source, and a third position at which they direct light diverted from the other source to their own optical loads. When one beam splitter is in its second position the other is in its third position, and vice versa. The output intensities of the light sources are preferably adjustable, and the intensity of the surviving source is increased in response to a failure of the other source.

These and other features and advantages of the invention will be apparent to those skilled in the art from the following detailed description, taken together with the accompanying drawings.

BRIEF DESCRIPTION OF THE DRAWINGS

FIG. 2 is a perspective, partially block diagram of a headlight control system that forms part of the invention;

FIG. 3 is an elevational view of an alternate headlight control system;

FIGS. 4 and 5 are respectively elevational and sectional views of one embodiment of an optical switch in accordance with the invention;

FIG. 6 is a block diagram of a light source adjustment system that can be used in connection with the switch of FIGS. 4 and 5;

FIG. 7 is a sectional view of another optical switch embodiment;

FIG. 8 is an elevational view of a third optical switch embodiment;

FIG. 9 is a elevational view of a shutter used with the switch of FIG. 8;

FIGS. 10a and 10b are sectional views of an optical switch that uses the concept of the FIG. 8 switch, with a preferred mechanical structure; The switch of FIG. 10a does not include GRIN lenses; the switch of FIG. 10b includes GRIN lenses;

FIG. 11 is a perspective view of an alternate shutter structure for the switch of FIG. 10;

FIG. 12 is a sectional view of another optical switch embodiment;

FIG. 13 is a sectional, partially block diagram of an optical oscillator in accordance with the invention;

DETAILED DESCRIPTION OF THE INVENTION

Figure 1:
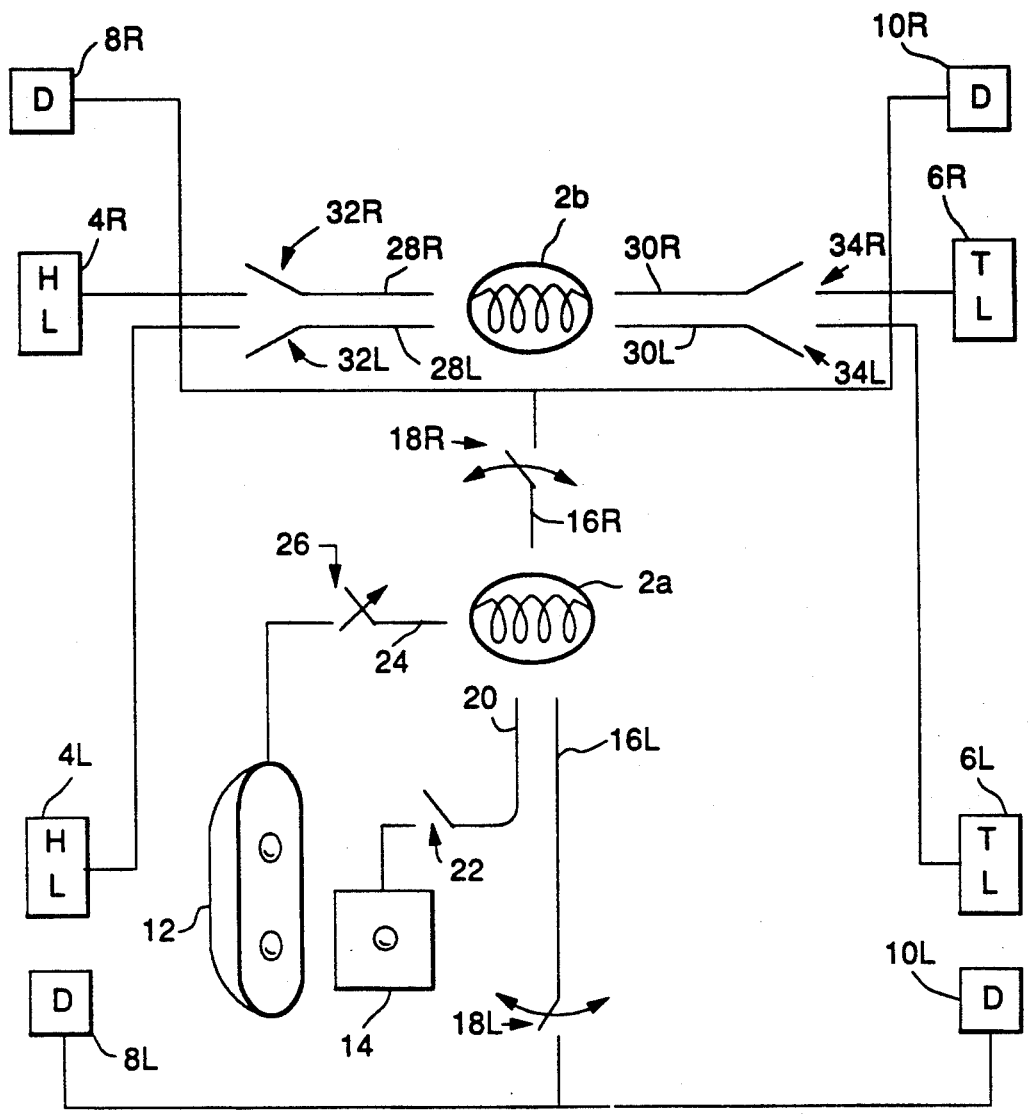
FIG. 1 is a block diagram of a distributed automobile lighting system from a central light source in accordance with the invention.

A block diagram of a distributed lighting system for an automobile is shown in FIG. 1. While automobiles are believed to be a significant application, the invention is not limited to automobiles and is also applicable to room lighting, other types of vehicles and environments in which multiple optical loads can be serviced from a central light source.

The system uses a small number of light sources, preferably long life metal halide high intensity discharge (HID) lamps 2a and 2b, to service all of the optical requirements for an automobile. While two separate light sources are illustrated, more sources or only one could also be used. However, at least two sources are preferred to provide a failsafe mechanism, described below in connection with FIG. 15, in case one of the lamps should fail.

The system of FIG. 1 is illustrated as having multiple optical loads, including right and left headlights 4R and 4L, right and left tail lights 6R and 6L, right and left front directional (turn) signals 8R and 8L, right and left rear directional (turn) signals 10R and 10L, an instrument panel light 12 and an overhead dome light 14. Additional optical loads, such as brake and trunk lights, would also be present, but have been omitted for simplicity since they would be serviced in a manner similar to the functions illustrated in FIG. 1.

The HID lamp 2a is shown illuminating a number of different optical fibers that supply illumination for the directional lights, instrument panel and overhead light, while lamp 2b illuminates optical fibers that supply the headlights and tail lights. Specifically, the first lamp 2a illuminates the input ends of optical fiber bundles 16R and 16L, which are respectively connected through optical oscillators 18R and 18L to the right and left sets of front and rear turn signal lights. The lamp 2a also illuminates the input end of an optical fiber 20 that is connected through an optical ON-OFF switch 22 for the overhead dome light 14, and the input end of another optical fiber 24 that is connected through a dimmer switch 26 for the instrument panel 12. The second lamp 2b illuminates the input ends of optical fibers 28R, 28L, 30R and 30L, which are respectively connected through ON-OFF optical switches 32R, 32L, 34R and 34L to the right and left headlights and the right and left tail lights.

Novel and improved designs for the optical switches, oscillators and dimmer, and also for the headlight assemblies, are provided by the invention. Referring first to the headlight assemblies 4R and 4L, a preferred design for each assembly is illustrated in FIG. 2. Each headlight consists of a linear array of Fresnel lenses 36. An input optical fiber bundle 38 includes a separate fiber for each lens; four separate input fibers 38a, 38b, 38c and 38d are illustrated. The end of each fiber is preferably held in a common mounting block 40, and are moved in common by a stepper motor 42 that is connected to adjust the position of the mounting block. The motor 42 is preferably capable of adjusting the position of the mounting block in three axes: vertically to switch between high and low headlight beam outputs; towards and away from the lenses to adjust the collimation of the output beam; and laterally if a lateral beam adjustment capability is desired.

Each of the fibers 38a–38d is aligned with and illuminates a corresponding lens 36a–36d. The fibers are normally positioned slightly above the lens focal axes and about a focal length behind the lenses to produce a low beam output that is directed slightly below horizontal. To switch to a high beam, the motor 42 moves the mounting block vertically downward until the fibers are approximately on the lens focal axes. This raises the output headlight beam to approximately horizontal. With conventional headlight lenses, which have both diameters and focal lengths of approximately 2.5 cm, a vertical travel on the order of 0.25 cm between the low and high beam fiber positions will normally be appropriate.

In a "smart" version of the headlight assembly, when the vehicle is in heavy traffic the reflection of the headlight beam from the tail of the car directly in front is detected and used to move the input fibers towards their respective lenses, thus diffusing the headlight beam, and/or to switch from high to low beams. This is also desirable for an oncoming vehicle in the opposing lane, until the oncoming vehicle is about to pass the car. On the other hand, when the car is on an open road the light beam can be adjusted to provide stronger and more directional lighting for better driving visibility. To distinguish between reflected light from a vehicle in front or a distant oncoming vehicle, and light from the headlights of an oncoming vehicle that is about to pass and no longer needs the diffused and/or low beams, a pair of photodetectors 44a and 44b may be used, with the two photodetectors laterally spaced from each other. Since one of the photodetectors will be significantly closer than the other to an oncoming vehicle that is to the side of the car and just about to pass, it will receive a stronger light intensity from the oncoming vehicle's headlights than the other photodetector. Any differences in the optical intensities of I1 and I2 reaching the two photodetectors is sensed by a differential detector 46, which responds by preventing the motor 42 from moving the fibers towards their respective lenses and/or lowering the beams when the ratio exceeds a preset value R. However, a headlight beam reflected from a vehicle directly in front or from a more distant oncoming vehicle will be received by the two photodetectors at the same intensity level. In this event the motor 42 will be actuated to move the fibers towards their respective lenses and thereby diffuse the headlight beam and/or to move the fibers up to lower the beams.

To prevent a diffusing of the headlights in response to the brake lights from a vehicle in front or some other non-headlight source, the photodetectors 44a and 44b can be made sensitive to a particular optical wavelength that is included in the headlight beams, but is not present in red or other non-headlight colors. The metal halide lamps that are typically used for headlights have a well defined short wavelength emission spectrum, including a line at approximate 4,000 Angstroms in the blue region. Making the photodetectors sensitive only to this or some other desired headlight wavelength will prevent them from actuating the motor in response to other colors. For a 2.5 cm focal length headlight lens, a horizontal fiber travel on the order of 1.2 cm will normally provide a suitable amount of diffusion. Conversely, the fibers can be moved backward away from their respective lenses, thereby increasing the collimation of the headlight beams, if there is no traffic in front of the vehicle as indicated by a lack of any headlight reflections.

A modification of the described headlight assembly is shown in FIG. 3. In this embodiment the input fiber 38a for a given headlight lens 36a illuminates one or the other of two output fibers 48a and 48b. Output fiber 48a is positioned to illuminate the lens so that a high beam is produced, while output fiber 48b is located above fiber 48a and illuminates the lens to produce a low beam. An electro-mechanical switch 50 is used to move the input fiber 38a between alignments with the two output fibers, and thus switches between high and low beam settings. The high beam setting for input fiber 38a is indicated in solid lines, while the low beam setting is indicated in dashed lines. Again, the input fibers for each of the headlight lenses are preferably mounted in a common mounting block and moved together as a unit.

Turning now to FIGS. 4 and 5, an improved optical ON-OFF switch that can be used in a distributed lighting system such as that of FIG. 1 is shown. The switch includes an input fiber 52a that receives light from a central source, and an output fiber 52b that supplies one of the vehicle's optical loads. The input fiber is held in either one or the other of two bistable positions by means of a shaped sleeve 54. The ON-OFF action is accomplished by holding one of the fibers stationary and moving the other fiber into and out of alignment with the first one. For this purpose the sleeve 54 has a generally figure-eight shape that accommodates the movable fiber at each end or chamber of the figure-eight. A deformable section 56 is provided between the sleeve's two end sections; it is sufficiently elastic so that the movable fiber can be shifted from one chamber of the figure-eight to the other by pushing the walls of the deformable section outward. The section then resiliently returns to its original shape to releasably retain the fiber in its new position. The sleeve 54 is most conveniently provided with the entire figure-eight shape formed from a unitary elastic material.

In the illustration if FIGS. 4 and 5, the input fiber 52a is movable between the two sleeve chambers, while the output fiber 52b remains stationary in the lower chamber. A suitable switch control for switching the input fiber between the upper and lower chambers, such as a spring-loaded plunger 58 that is coupled to the moving fiber via a rigid sleeve 60, allows the switch to be set either ON with the two fibers aligned, or OFF with the input fiber shifted to the upper chamber (indicated in dashed lines in FIG. 4). Once the input fiber is forced into one chamber it remains in that location, and hence the designation "bistable".

The described switch can be coupled with an energy saving mechanism that reduces the output of the source lamp when the switch is in its OFF position. This technique employs a reflective surface 62 (shown in FIG. 4) that faces the input fiber 52a within the sleeve chamber that is not occupied by the output fiber 52b. The manner in which the reflected beam is used to reduce the source lamp intensity is illustrated in FIG. 6. After reflection in the switch, the light traveling through the input fiber 52a returns back through that fiber to the vicinity of the source lamp 2b. There it is extracted by a mechanism such as a one-way mirror 64 that transmits light from the lamp 2b into the fiber, but deflects light returned back from the fiber. The deflected light is sensed by an attenuator 66 that reduces the intensity of the lamp 2b by a desired amount. The lighting system can thus be actively managed for maximum power efficiency.

An alternate switch design is shown in FIG. 7. In this embodiment, the input and output fibers 52a and 52b are surrounded by respective rigid sleeves 68a and 68b, with a hinge 70 fixedly mounted and connecting the two sleeves together at a pivot point. An opaque shutter 72 is carried by a spring-biased plunger 74, which in turn is connected to the opposite sides of the sleeves 68a and 68b by means of respective push rods 76a and 76b. The push rods are pivotally connected at their opposite ends to the plunger and to their respective fiber sleeves, such that depressing the plunger causes the sleeves 68a and 68b to pivot away from each other about hinge 70 and the shutter 72 to be inserted between the fibers 52a and 52b, while lifting the plunger withdraws the shutter from between the fibers and rotates the two sleeves closed to align the fibers with each other. The switch is thus ON with the input fiber 52a aligned with and transmitting light to the output fiber 52b when the plunger is raised, and OFF with the shutter 72 deflecting light from the output fiber 52b when the plunger is depressed. As with the switch of FIGS. 4 and 5, the plunger can be either mechanically or electro-mechanically activated.

To reduce optical reflection losses in case small gaps are present between the adjacent ends of the input and output fibers 52a and 52b, the switch shown in FIG. 7 is preferably sealed within a liquid reservoir 78. The reservoir is flooded with a liquid 80 that has a refractive index which is substantially matched to that of the fibers; for plastic fibers a suitable liquid is optical gel no. 0607 or 0608 from Cargille Laboratories, Inc., with a refractive index of 1.457. The liquid fills in any gaps that may be left between the aligned ends of the fibers when the switch is ON, and thus provides a substantially continuous optical path between the input and output fibers.

Another optical switch embodiment is shown in FIGS. 8 and 9. The controlling portion of this switch is a movable shutter 82 that can be either manually or electro-magnetically moved to enable or block optical transmission between the input and output fibers 52a and 52b. The shutter is formed from a thin opaque material, such as a metal piece about 200 microns thick. For manual operation, the shutter preferably has a spring-loaded mechanism 84 that locks the shutter in place when depressed, and releases it when depressed a second time.

The shutter includes a generally transmissive section 86 that is preferably about the diameter of the fibers. The shutter is moved to position the transmissive section 86 in alignment with the input and output fibers to turn the switch ON, and then displaced so that the opaque shutter material blocks light transmission between the two fibers to turn the switch OFF. The transmissive section 86 can include a color filter if coloration is desired for the light transmitted to the output fiber 52b as shown by shading in FIG. 9.

Since the light emitted from the end of the input fiber 52a normally fans out, some of this light will be lost from the output fiber even when the switch is ON. To reduce this loss, and also to relax the need to position the two fibers very close to each other as well as have them highly aligned, a pair of gradient index (GRIN) rod lenses 88a and 88b can be positioned respectively between the end of input fiber 52a and the shutter, and between the shutter and the end of output fiber 52b. When assembled in the switch with opposite orientations, the action of these two lenses is to expand a light beam emitted from the input fiber, and then to contract the expanded beam back into the output fiber. For this purpose the transmissive shutter section 86 should be enlarged to accommodate the expanded beam.

The use of the sliding shutter can easily be used to add a dimmer function to the switch. The mechanical or electro-mechanical shutter control needs merely to be able to move the shutter to intermediate positions between full ON and full OFF to make it a dimming switch. This is useful, for example, in connection with instrument panel illumination.

Preferred implementations are shown in FIGS. 10a and b and 11 for the switching concept of FIGS. 8 and 9. A housing is provided that allows for a very convenient assembly and adjustment of the operative switch elements. The solid housing 90 has a pair of intersecting bores, one bore 92a for the optical fibers and the other bore 92b for the shutter. The input and output fibers 52a and 52b are carried by respective pistons 94a and 94b that are slidingly lodged within the fiber bore 92a on opposite sides of its intersection with the shutter bore 92b. The two fibers are held in alignment with each other so that light emitted from the input fiber illuminates the output fiber when the switch is ON.

Figure 10B:
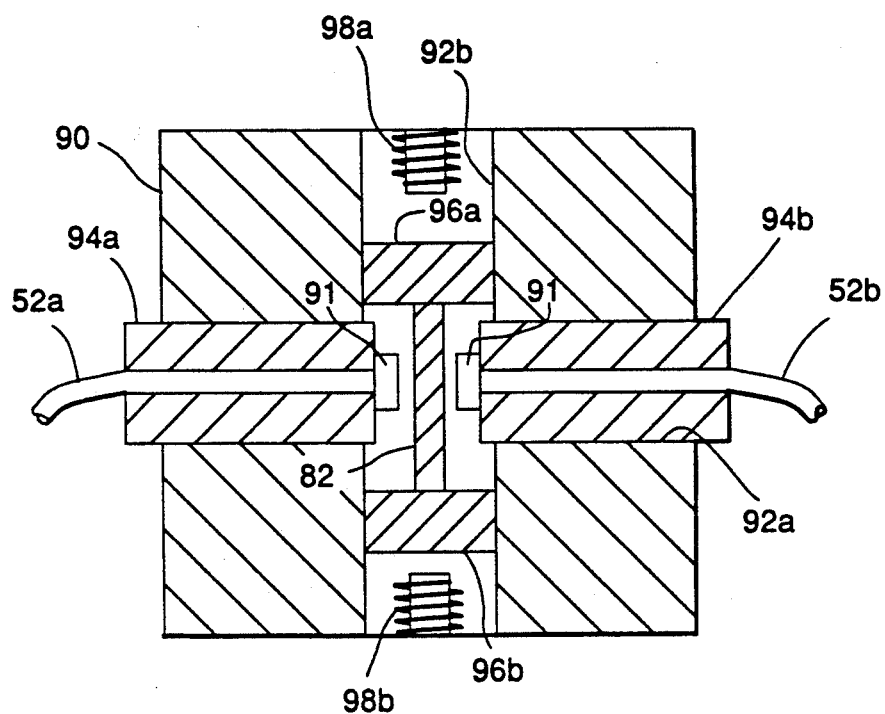

Within the shutter bore 92b, the shutter 82 is held between pistons 96a and 96b on opposite sides of the bore intersection. For electro-magnetic shutter control such as the use of electromagnets 98a and 98b at the opposite ends of the shutter bore, the shutter pistons are formed from a magnetic material. Alternately, a mechanical control can be provided for adjusting the shutter position. In this event the shutter pistons can be extended to the length of pistons 96a' and 96b' as shown in FIG. 11, so that the end of one piston extends out of one end of the bore while the end of the other piston is flush with the other end of the bore. As shown in FIG. 10b, GRIN lenses 91 could also be used in this configuration.

An additional switch embodiment is illustrated in FIG. 12. This switch is based upon the optical phenomenon of total internal reflection. Input and output fibers 52a and 52b are optically coupled to a transparent housing 100, either by positioning the ends of the fibers next to the housing or by inserting them into insets (not shown) within the housing. The fibers are aligned with each other such that a beam emitted from the input fiber 52a will reach the output fiber 52b unless interrupted by the switch. The main body of the housing preferably comprises a pair of prisms 102a and 102b that are formed from the same material, and have angled surfaces 104a and 104b that are spaced apart within the housing to form a cavity. A reservoir 106 that is shown within the housing, but can also be provided externally and coupled into the housing through appropriate tubing, opens to the cavity 108 and stores a generally transmissive liquid 110. A mechanism, such as a spring-biased piston 112, is provided to move liquid from the reservoir into and out of the cavity 110. The angle of the prism wall 104a relative to the optical transmission path between the fibers 52a and 52b, and the liquid's refractive index, are selected such that light emitted by the input fiber 52a is transmitted through the cavity to the output fiber 52b when the liquid is in the optical path within the cavity, but is reflected by total internal reflection at the cavity wall 104a and prevented from reaching the output fiber when the liquid is withdrawn from the cavity. For this purpose the liquid preferably has a refractive index that is approximately equal to that of the housing material. Plastics that can be used for the housing typically have a refractive index of about 1.4-1.6, while glass has a refractive index of 1.47. An example of a suitable liquid is Fused Silica Matching Fluid from Cargille Laboratories, Inc., with a refractive index of 1.4587.

The piston 112 and open portion of the reservoir 106 are offset into or out of the page from the optical path between the input and output fibers, and accordingly do not interfere with the light transmission when the switch is ON. As with the other switches described above, the switch of FIG. 12 can be actuated either mechanically or electro-mechanically. A pair of GRIN lenses (not shown) are also preferably used with the input and output fibers to reduce losses.

The invention also includes improved optical oscillators for operating directional signals and the like. Such an oscillator is shown in FIG. 13, in which the input fiber 52a is shown aligned with and illuminating the output fiber 52b in its ON position, and illuminating a photodetector 114 in its OFF position 52a'. The input fiber is normally urged towards its OFF position by a mechanism such as coil spring 116. The illuminated photodetector 114 causes a device such as electromagnet 118 to move the input fiber to its ON position; this is accomplished by providing a magnetic sleeve 120 around the input fiber. The photodetector is preferably implemented as a solar cell that provides a direct electrical actuation of the electromagnet 118 through connecting lead wires 122, but it can also be formed as a more passive photodetector that actuates a separate electrical drive for the electromagnet.

In operation, the input fiber is normally in its OFF position 52a'. Until the oscillator is actuated, the solar cell 114 is prevented from actuating electromagnet 118 by a suitable mechanism, such as a shutter between the solar cell and the input fiber, or by an electrical switch in the solar cell-electromagnet circuit. This inhibition is removed when oscillator operation is desired, and the solar cell energizes the electromagnet to shift the input fiber 52a into alignment with the output fiber 52b. The light transmitted through the input fiber thus continues on through the output fiber to the directional signal or other optical load, causing it to flash on. Once the light from the input fiber has been removed from the solar cell, however, the spring 116 restores the input fiber to its original position, at which the solar cell is illuminated but the output fiber is not. The input fiber thus oscillates back and forth between its OFF and ON positions, causing the directional signal to flash on and off.

Figure 14:
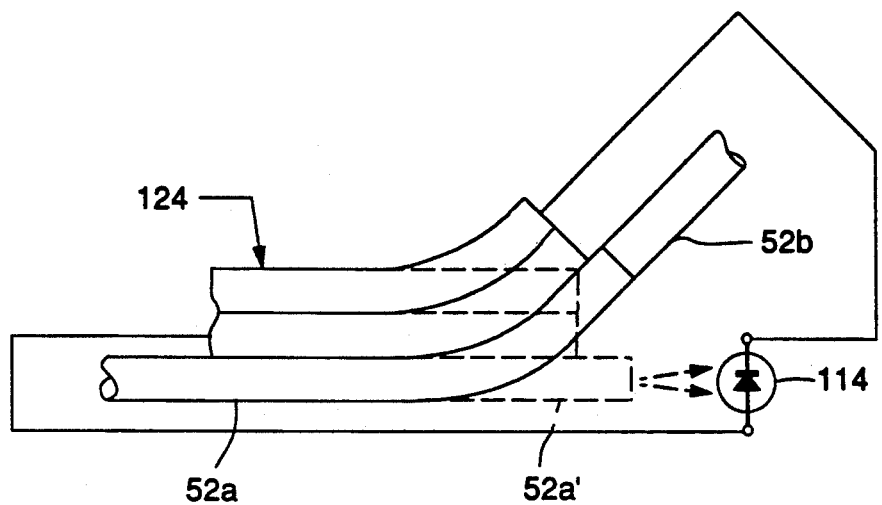
FIG. 14 is an elevational, partially block diagram of an alternate optical oscillator.

A variation of this oscillator is illustrated in FIG. 14. Instead of the spring 116 and electromagnet 118, a bimetallic strip 124 is coupled to the input fiber. The input fiber's normal OFF position is indicated in dashed lines 52a', illuminating the solar cell 114. The solar cell is connected directly to the bimetallic strip, and passes a heating current through the strip when the oscillator is actuated. Heating the strip causes it to flex, thus flexing the input fiber 52a into alignment with the output fiber 52b. This in turn removes the illumination from the solar cell, so that it allows the bimetallic strip to cool and to restore the input fiber back into alignment with the solar cell. Oscillation between the ON and OFF positions again continues for as long as the solar cell circuit is enabled. A suitable structure for the bimetallic strip is the industry standard ASTM Type TM2, preferably 0.025 inch thick, 0.25 inch wide and 1.5 inch long. This strip should be heated to about 250° F. to produce an adequate flexing (about ¼ inch) of the input fiber.

Figure 15:
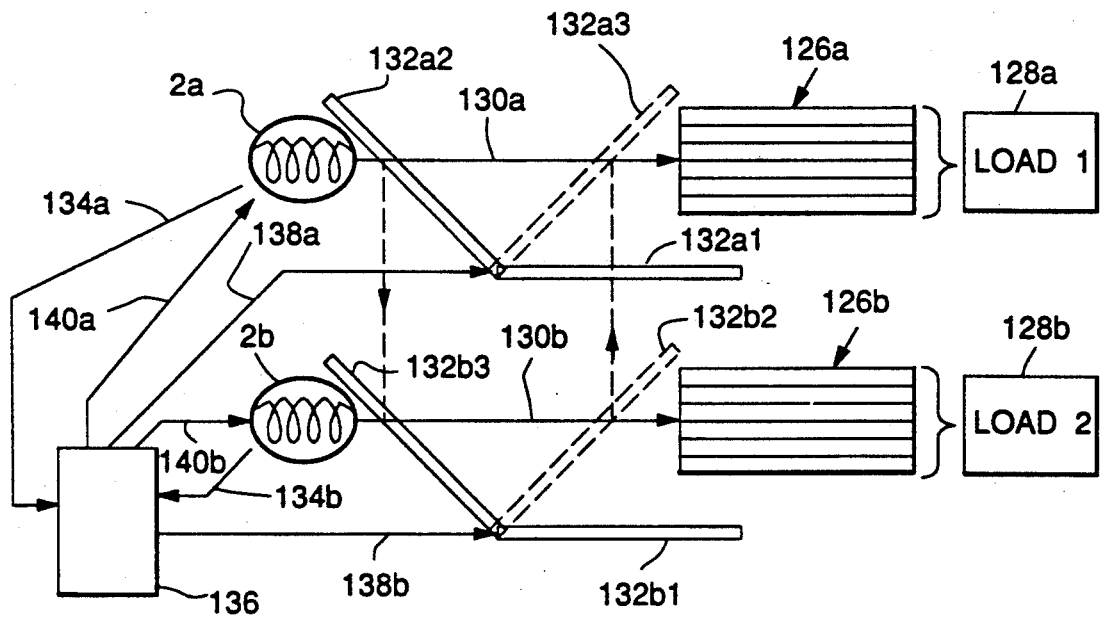
FIG. 15 is a block diagram of a failsafe central light source for a distributed lighting system.

The invention also includes a failsafe system in which multiple lamps are used, with each lamp backing up another lamp in case it fails. Such a system is illustrated in FIG. 15, with lamps 2a and 2b respectively illuminating optical fiber bundles 126a and 126b that respectively provide light for a first set of optical loads 128a (such as the vehicle headlights and tail lights), and for a second set of optical loads 128b (such as the vehicle's remaining optical devices). The light paths between lamps 2a and 2b and their respective fiber bundles 126a and 126b are indicated by vectors 130a and 130b, respectively.

Respective partially reflective beam splitters 132a1 and 132b1 are provided for the lamps 2a and 2b, and are normally held out of the optical path between the lamps and fiber bundles. The beam splitters are actuated when the failure of one of the lamps is sensed. Numerous sensing mechanisms can be devised, such as optical fibers 134a and 134b that are illuminated respectively by lamps 2a and 2b. The other ends of fibers 134a and 134b are coupled to a photodetector system 136 that senses when one of the lamps has failed, and transmits corresponding electrical control signals to the beam splitters over electrical lines 138a and 138b.

The beam splitters 132a1 and 132b1 can each be pivoted to respective second and third positions 132a2, 132a3 and 132b2, 132b3. In their second positions, each of the beam splitters transmits a portion of the light from their respective lamps to their respective fiber bundles, and reflect the rest of the light to the beam splitter for the other lamp, while in their third positions they reflect light from the other beam splitter into their respective fiber bundles.

To understand the operation of the failsafe system, assume first that the lamp 2b has failed. This is sensed by the controller 136, which causes the first and second beam splitters to pivot respectively to their second and third positions 132a2 and 132b3. In this position the partially reflective first beam splitter transmits a portion of the light from lamp 2a to its fiber bundle 126a and reflects the rest of the light to the other beam splitter, with which it is now optically aligned. The second beam splitter in its position 132b3 reflects a portion of the light received from the first beam splitter to the fiber bundle 126b for the second beam splitter. The first beam splitter preferably reflects about 62% of the light it receives to the second beam splitter, so that the two sets of optical loads 128a and 128b receive approximately equal illuminations.

If the first lamp 2a fails, the first beam splitter is pivoted to its third position 132a3, while the second beam splitter is pivoted to its second position 132b2. In these positions a portion of the light from lamp 2b is reflected to the first beam splitter and from there into its associated fiber bundle 126a, with the remainder of the light from lamp 2b is transmitted through the second beam splitter into its own fiber bundle 126b. Again, there is preferably an equal sharing of light between the two sets of optical loads.

The efficiency of the described failsafe system is less than optimum, since not all of the light reflected from the surviving bulb will reach the fibers for the failed bulb; a portion will escape through the partially reflective beam splitter for the failed bulb. The optical efficiency can be improved by providing two pairs of beam splitters that are rotatable respectively to positions 132a2, 132a3, 132b2, and 132b3 from initial positions outside the optical paths. By making the beam splitters that are rotatable to positions 132a2 and 132b2 50% reflective and the beam splitters that are rotatable to positions 132a3 and 132b3 fully reflective (i.e., mirrors), the loss of light through the latter two beam splitters can be substantially eliminated.

It can thus be seen that each lamp backs up the other in case of failure. To counteract the reduction in illumination that would normally result from splitting the light from one lamp between both sets of loads, the controller 136 can also be set up to amplify the output from the surviving lamp. Control lines 140a and 140b that run from the controller respectively to lamps 2a and 2b are illustrated for this purpose.

The invention can thus be seen to provide significant improvements for a distributed lighting system. While several illustrative embodiments of the invention have been shown and described, numerous variations and alternate embodiments will occur those skilled in the art. Such variations and alternate embodiments are contemplated, and can be made without departing from the spirit and scope of the invention as defined in the appended claims.

We claim:

1. A lighting system for a vehicle that includes a plurality of headlight assemblies, comprising:
   a light source,
   a plurality of optical loads,
   an optical fiber network extending from said light source to provide illumination for said optical loads, and
   at least one optical switch within said optical fiber network, each of said switches including a respective input fiber from said light source and a respective output fiber to a respective optical load, said switches operating by selectively enabling or disabling an optical connection between their respective input and output fibers,
   each of said headlight assemblies including:
      at least one headlight lens for transmitting a headlight beam,
      a respective optical fiber of said optical fiber network aligned with each lens to illuminate the lens for transmitting a headlight beam, and
      means for adjusting the positions of said fibers relative to their respective lenses to adjust the nature of the headlight beam.

2. The vehicle lighting system of claim 1, said fiber adjusting means for each headlight assembly comprising means for moving the fibers in a generally vertical direction to switch between high and low beam positions.

3. The vehicle lighting system of claim 1, said fiber adjusting means for each headlight assembly comprising means for moving the fibers toward and away from their respective lenses to adjust the beam collimation.

4. The vehicle lighting system of claim 1, each headlight assembly including a plurality of lenses and aligned fibers, said aligned fibers being held in a common mounting member, and a motor for adjusting the position of said mounting member.

5. The vehicle lighting system of claim 1, further including means for detecting light within a predetermined wavelength from the opposite side of the lenses from said fibers, said adjusting means adjusting the positions of said headlight fibers in response to such detected light.

6. The vehicle lighting system of claim 5, wherein said light detecting means responds to light at a wavelength of the headlight beam to adjust the positions of said headlight fibers.

7. The vehicle lighting system of claim 6, wherein said headlight fiber position adjusting means moves the fibers with respect to their respective lenses to increase the headlight beam diffusion and/or lower the headlight beam in response to said light detecting means detecting light at said headlight beam wavelength.

8. The vehicle lighting system of claim 5, said light detecting means including at least two light detectors that are laterally spaced from each other, and means for enabling said headlight fiber position adjustment only in response to the ratio of light intensities detected by said detectors corresponding to the reflection of said headlight beam from a vehicle in front in the same traffic lane and/or a distant oncoming vehicle in an adjacent traffic lane, but not to the detection of a headlight beam from a nearby oncoming vehicle in the adjacent traffic lane.

9. The vehicle lighting system of claim 1, wherein the optical fiber for each lens comprises an input fiber, and further comprising a plurality of output fibers for each lens, said output fibers being located at different positions relative to their respective lenses so that the lenses transmit headlight beams in different directions when illuminated by different ones of their respective output fibers, and said means for adjusting the positions of said input fibers operates by moving said input fibers between optical alignments with their respective output fibers.

10. A lighting system comprising:
    a light source,
    a plurality of optical loads,
    an optical fiber network extending from said light source to provide illumination for said optical loads, and
    at least one optical switch within said optical fiber network, each of said switches including a respective input fiber from said light source and a respective output fiber to a respective optical load, said switches operating by selectively enabling or disabling an optical connection between their respective input and output fibers, at least one of said optical switches, comprising:
       a housing having a pair of intersecting fiber and shutter bores extending through the housing,
       a pair of fiber pistons positionable in said fiber bore on opposite sides of said intersection, said fiber pistons including means for holding respective input and output fibers in optical alignment with each other,
       an opaque shutter that is positionable within said shutter bore to block the transmission of light between said input and output fibers in a switch OFF position, said shutter including a generally transmissive section that enables the transmission of light between said input and output fibers when the transmissive section is positioned between said fibers in a switch ON position, and
       a pair of shutter pistons mounting said shutter between them and movable through said shutter bore as a unit with said shutter between said switch OFF and switch ON positions.

11. The lighting system of claim 10, further comprising a mechanical control means for controlling the position of said shutter pistons within said shutter bore.

12. The lighting system of claim 10, said shutter pistons being formed from a magnetic material, and further comprising a pair of electromagnets on opposite sides of said shutter pistons within said shutter bore, and means for selectively actuating said electromagnets to control the positions of said shutter and shutter pistons within said bore.

13. The lighting system of claim 10, further comprising first and second gradient index rod lenses respectively between said input fiber and bore intersection and between said bore intersection and output fiber within said fiber bore, said lenses expanding a light beam from the input lens and contracting the beam back into said output fiber after transmission through said generally transmissive shutter section with said switch in an ON position, said lenses reducing light losses that would otherwise occur from forming of a light beam emitted from said input fiber.

14. The lighting system of claim 10, said generally transmissive shutter section comprising a color filter.

15. A vehicle headlight assembly, comprising:

at least one optical lens for transmitting a headlight beam, a respective optical fiber aligned with each lens to illuminate the lens for transmitting a headlight beam, and means for adjusting the positions of said fibers relative to their respective lenses to adjust the nature of the headlight beam.

16. The headlight assembly of claim 15, said fiber adjusting means comprising means for moving the fibers in a generally vertical direction to switch between high and low beam positions.

17. The headlight assembly of claim 15, said fiber adjusting means comprising means for moving the fibers toward and away from their respective lenses to adjust the beam collimation.

18. The headlight assembly of claim 15, including a plurality of lenses and aligned fibers, wherein said fibers are held in a common mounting member, and a motor is provided for adjusting the position of said mounting member.

19. The headlight assembly of claim 15, further including means for detecting light within a predetermined wavelength from the opposite side of the lenses from said fibers, said adjusting means adjusting the position of said fibers in response to such detected light.

20. The headlight assembly of claim 19, wherein said light detecting means responds to light at a wavelength of the headlight beam to adjust the positions of said fibers.

21. The headlight assembly of claim 20, wherein said fiber position adjusting means moves the fibers closer to their respective lenses to increase the diffusion of the headlight beam in response to said light detecting means detecting light at said headlight beam wavelength.

22. The headlight assembly of claim 19, said light detecting means including at least two light detectors that are laterally spaced from each other, and means for enabling said fiber position adjustment only in response to the ratio of light intensities detected by said detectors corresponding to the reflection of said headlight beam from a vehicle in front in the same traffic lane and/or a distant oncoming vehicle in an adjacent traffic lane, but not to the detection of a headlight beam from a nearby oncoming vehicle in the adjacent traffic lane.

23. The headlight assembly of claim 15, wherein said optical fibers comprises input fibers, and further comprising a plurality of output fibers for each lens, said output fibers being located at different positions relative to their respective lenses so that the lenses transmit headlight beams in different directions when illuminated by different ones of their respective output fibers, and said means for adjusting the positions of said input fibers operates by moving said input fibers between optical alignments with their respective output fibers.

24. An optical switch, comprising:
input and output optical fibers having aligned but mutually spaced ends,
an opaque shutter between said fiber ends, said shutter including a generally transmissive section,
means for moving said shutter between a switch OFF position with the shutter blocking the transmission of light between said fibers, and a switch ON position with the shutter's generally transmissive section aligned with said fibers and enabling the transmission of light therebetween, and
first and second gradient index rod lenses respectively between said input fiber and shutter, and between said shutter and output fiber, said lenses expanding a light beam from the input fiber and contracting the beam back into said output fiber after transmission through said generally transmissive shutter section with said switch in an ON position, said lenses reducing light losses that would otherwise occur from fanning of a light beam emitted from said input fiber.

25. The optical switch of claim 24, said generally transmissive section comprising a color filter.

26. The optical switch of claim 25, said shutter moving means including means for moving said shutter to intermediate positions between said OFF and ON switch position, and thereby providing a dimming capability.

27. An optical switch, comprising:
a housing having a pair of intersecting fiber and shutter bores extending through the housing,
a pair of fiber pistons positionable in said fiber bore on opposite sides of said intersection, said fiber pistons including means for holding respective input and output fibers in optical alignment with each other,
an opaque shutter that is positionable within said shutter bore to block the transmission of light between said input and output fibers in a switch OFF position, said shutter including a generally transmissive section that enables the transmission of light between said input and output fibers when the transmissive section is positioned between said fibers in a switch ON position, and
a pair of shutter pistons mounting said shutter between them and movable through said shutter bore as a unit with said shutter between said switch OFF and switch ON positions.

28. The optical switch of claim 27, further comprising a mechanical control means for controlling the position of said shutter pistons within said shutter bore.

29. The optical switch of claim 27, said shutter pistons being formed from a magnetic material, and further comprising a pair of electromagnets on opposite sides of said shutter pistons within said shutter bore, and means for selectively actuating said electromagnets to control the positions of said shutter and shutter pistons within said bore.

30. The optical switch of claim 27, further comprising first and second gradient index rod lenses respectively between said input fiber and bore intersection and between said bore intersection and output fiber within said fiber bore, said lenses expanding a light beam from the input lens and contracting the beam back into said output fiber after transmission through said generally transmissive shutter section with said switch in an ON position, said lenses reducing light losses that would otherwis occur from forming of a light beam emitted from said input fiber.

31. The optical switch of claim 27, said generally transmissive shutter section comprising a color filter.

32. A failsafe lighting system for multiple optical loads, comprising:
at least two light sources connected by optical fibers to respective optical loads,
respective optical beam splitters associated with each of said light sources for diverting a portion of the light from its respective light source to the optical load for another light source while continuing to supply a portion of the light from its respective light source to its own optical loads, so that both sets of loads are supplied by the same light source, and actuating means responsive to the failure of one light source for actuating the beam splitter for the other light source.

33. The failsafe lighting system of claim 32, wherein the beam splitter for each light source has a first non-actuated position, a second position at which it diverts a portion of the light from its respective light source to the optical load for another light source, and a third position at which it directs light diverted from another light source to its own optical load, said actuating means placing the beam splitter for each of said light sources in its third position when the beam splitter for the other light source is in its second position.

34. The failsafe lighting system of claim 33, wherein said beam splitters are rotatable between said first, second and third positions, with the second position for each beam splitter is optically aligned with the third position for the other beam splitter to which it diverts light when the other beam splitter's light source has failed.

35. The failsafe lighting system of claim 32, wherein the beam splitter for each light source is moveable between a first position out of the optical path between its light source and optical load and a second position at which it diverts a portion of the light from its respective light source, and further comprising respective reflectors for each of said light sources that are moveable between first positions out of the optical paths between their light sources optical loads, and second positions that are optically aligned with the second positions for the other light source's beam splitter, said reflectors in their second positions reflecting light from the beam splitter for the other light source into the optical load for their own light source.

36. The failsafe lighting system of claim 32, for a vehicle lighting system, wherein one light source normally illuminates the vehicle's head and tail lights, and another light source normally illuminates the vehicle's other lighting systems.

37. The failsafe lighting system of claim 32, wherein the output intensities from said light sources is adjustable, and further comprising means for increasing the output intensities of said light sources when a portion of their optical outputs is diverted to the optical load for another light source.

* * * * *